(12) United States Patent
Yang et al.

(10) Patent No.: US 8,159,120 B2
(45) Date of Patent: Apr. 17, 2012

(54) PIXEL TUBE FOR FIELD EMISSION DEVICE

(75) Inventors: Yuan-Chao Yang, Beijing (CN); Yang Wei, Beijing (CN); Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 421 days.

(21) Appl. No.: 11/777,179

(22) Filed: Jul. 12, 2007

(65) Prior Publication Data
US 2008/0030123 A1    Feb. 7, 2008

(30) Foreign Application Priority Data
Aug. 2, 2006    (CN) .......................... 2006 1 0061946

(51) Int. Cl.
*H01J 63/00* (2006.01)
*H01J 63/04* (2006.01)
(52) U.S. Cl. .......................... 313/495; 313/483; 313/496
(58) Field of Classification Search .................. 313/483, 313/495–497, 309, 311
See application file for complete search history.

(56) References Cited

U.S. PATENT DOCUMENTS

| | | | |
|---|---|---|---|
| 5,945,780 A | 8/1999 | Ingle et al. | |
| 6,445,124 B1 | 9/2002 | Asai et al. | |
| 6,957,993 B2 | 10/2005 | Jiang et al. | |
| 2002/0084502 A1* | 7/2002 | Jang et al. | 257/432 |
| 2004/0053780 A1 | 3/2004 | Jiang et al. | |
| 2004/0150322 A1* | 8/2004 | Busta | 313/495 |
| 2005/0236961 A1 | 10/2005 | Wei et al. | |
| 2006/0091782 A1* | 5/2006 | Liu et al. | 313/496 |
| 2006/0132048 A1* | 6/2006 | Popovich | 315/160 |
| 2007/0075619 A1* | 4/2007 | Jiang et al. | 313/336 |

FOREIGN PATENT DOCUMENTS

| | | |
|---|---|---|
| CN | 1339814 A | 3/2002 |
| CN | 1484275 | 3/2004 |
| CN | 1492489 A | 4/2004 |
| CN | 2731902 Y | 10/2005 |
| WO | WO 2007015710 A2 * | 2/2007 |

* cited by examiner

*Primary Examiner* — Joseph L Williams
*Assistant Examiner* — Nathaniel Lee
(74) *Attorney, Agent, or Firm* — Altis Law Group, Inc.

(57) ABSTRACT

A triode field emission device (100) includes a sealed container (110) having a light permeable portion (120), a phosphor layer (130) formed on the light permeable portion in the sealed container, an anode (140) formed on the phosphor layer, a cathode (150) arranged in the sealed container and facing the light permeable portion, and a grid (160) arranged in the sealed container and between the cathode and the anode. The cathode has a carbon nanotube yarn (151) facing toward the light permeable portion configured for serving as an emission source for electrons.

18 Claims, 1 Drawing Sheet

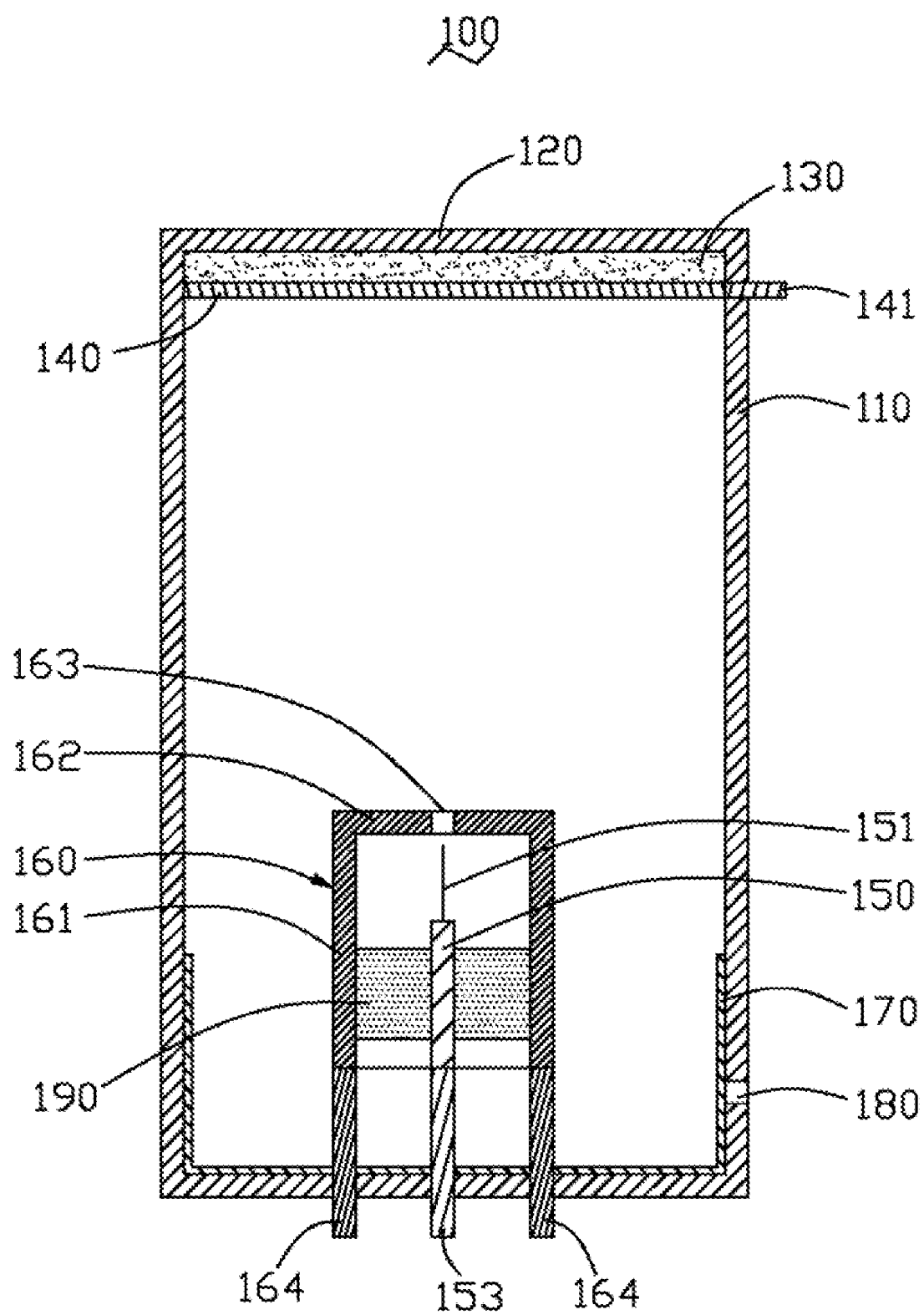

PIXEL TUBE FOR FIELD EMISSION DEVICE

BACKGROUND OF THE INVENTION

1. Field of the Invention

The present invention relates to field emission devices and, more particularly, to a pixel tube for a field emission device.

2. Description of Related Art

Field emission devices are based on emission of electrons in a vacuum. Electrons are emitted from micron-sized tips in a strong electric field, and the electrons are accelerated and collide with a fluorescent material. The fluorescent material then emits visible light. Field emission devices are thin, light weight, and provide high levels of brightness.

Conventionally, a material of the tips is selected from the group consisting of molybdenum (Mo) and silicon (Si). With the development of nano-technology, carbon nanotubes (CNTs) are also used for the tips of the field emission devices.

Theoretically, CNTs have small diameters and large slenderness (i.e. diameter/length) ratios thus making CNTs a powerful field emission enhancer. However, in practice, like a flat panel display, the field emission enhancement of the entire field emission film cannot achieve the field emission enhancement of a single CNT. As a result, emission voltage of the whole system is increased, and current density is decreased. Meanwhile, the process technique becomes complicated, and the cost becomes relatively high.

What is needed, therefore, is a pixel tube for a field emission device that has good field emission efficiency and is easy to manufacture.

SUMMARY OF THE INVENTION

A pixel tube for a field emission device according to a preferred embodiment, includes a sealed container having a light permeable portion, a phosphor layer formed on the light permeable portion in the sealed container, an anode electrode formed on the phosphor layer, a cathode electrode arranged in the sealed container and facing the light permeable portion, a carbon nanotube yarn attached to the cathode electrode and extending toward the light permeable portion for emitting electrons therefrom, and an electrically conductive shielding enclosure arranged in the sealed container. The enclosure includes a peripheral wall and a top wall. The peripheral wall surrounds the carbon nanotube yarn therein. The top wall defines an opening therein and functions as a grid electrode.

The present pixel tube employs the carbon nanotube yarn for emitting electrons, the luminance of the pixel tube is enhanced while using a relatively low voltage. Furthermore, since the enclosure is surrounded by the carbon nanotube yarn, the enclosure can shield the high-voltage supplied to the anode electrode to protect the carbon nanotube yarn. Thus, the carbon nanotube yarn has a long life. The amount of the electrons emitted from the carbon nanotube yarn can be adjusted by altering the voltage supplied to the enclosure, thus adjusting the luminance of the pixel electrode.

Other advantages and novel features of the present invention will become more apparent from the following detailed description of preferred embodiment when taken in conjunction with the accompanying drawings.

BRIEF DESCRIPTION OF THE DRAWING

Many aspects of the present pixel tube can be better understood with reference to the following drawing. The components in the drawing are not necessarily to scale, the emphasis instead being placed upon clearly illustrating the principles of the present pixel tube. Moreover, in the drawing, like reference numerals designate corresponding parts throughout the several views.

The FIGURE is a schematic, cross-sectional view of a pixel tube for a field emission device according to a preferred embodiment of the present invention.

DETAILED DESCRIPTION OF THE INVENTION

Reference will now be made to the drawings to describe a preferred embodiment of the present pixel tube for a field emission device in detail.

Referring to the figure, a pixel tube 100 for a field emission device in accordance with a preferred embodiment, includes a sealed container 110 having a light permeable portion 120, a phosphor layer 130, an anode electrode 140, a cathode electrode 150 and an electrically conductive shielding enclosure 160. The phosphor layer 130, the anode electrode 140, the cathode electrode 150 and the electrically conductive shielding enclosure 160 are all enclosed in the sealed container 110. Furthermore, the phosphor layer 130 and the anode electrode 140 are attached on an inner surface of the light permeable portion 120 of the sealed container 110 one on top of the other in that order. The cathode electrode 150 faces the light permeable portion 120 of the sealed container 110, and a carbon nanotube yarn 151 is attached to the cathode electrode 150 for emitting electrons therefrom. The electrically conductive shielding enclosure 160 includes a peripheral wall 161 and a top wall 162. The peripheral wall 161 surrounds the carbon nanotube yarn 151 therein. The top wall 162 has an opening defined therein and functions as a grid electrode.

The sealed container 110 is a hollow member that defines an inner space, and the inner space is held in vacuum. The cross section of the sealed container 110 has a shape selected from a group consisting of circular, ellipsoid, quadrangular, triangular, polygonal and so on. In this exemplary embodiment, the sealed container 110 is a hollow cylinder. The sealed container 110 may be comprised of a nonmetallic material, such as quartz or glass. Such materials as quartz or glass are beneficial in that they are electrically insulative. The light permeable portion 120 has a surface, which may be a plane surface, a spherical surface or an aspherical surface. The sealed container 110 may be light permeable, and preferably transparent.

The phosphor layer 130 is arranged on the light permeable portion 120. The phosphor layer 130 may be a white phosphor layer, or a tinted phosphor layer, such as red, green or blue. If the electrons collide with the phosphor layer 30, white light or tinted light can be emitted.

The anode electrode 140 is arranged on the light permeable portion 120 and covers the phosphor layer 130. The anode electrode 140 may be an aluminum film with good electrical conductivity. The anode electrode 140 is electrically connected with an anode terminal 141. The anode terminal 141 runs from the inside to the outside of the sealed container 110 and is electrically connected with a power source (not shown). A high voltage produced by the power source is supplied to the anode electrode 140 through the anode terminal 141 to accelerate the electrons emitted from the carbon nanotube yarn 151 to collide with the phosphor layer 130.

The carbon nanotube yarn 151 is attached to the cathode electrode 150 and extending toward the light permeable portion 120 for emitting electrons therefrom. A method for making a carbon nanotube yarn 151 is taught in U.S. Pub. No. 2004/0053780 entitled "Method for fabricating carbon nanotube yarn", which is incorporated herein by reference. Preferably, the carbon nanotube yarn 151 extends substantially perpendicular to the light permeable portion 120. The cathode electrode 150 is an electrically and thermally conductive metal wire, having a strong mechanical strength. In this exemplary embodiment, the cathode electrode 150 is comprised of copper. The carbon nanotube yarn 151 has a length in an approximate range from 0.1 millimeters to 10 millimeters, and a diameter in an approximate range from 1 micrometer to 1 millimeter.

The carbon nanotube yarn 151 can be obtained by drawing a bundle of carbon nanotubes from a super-aligned carbon nanotube array to be held together by van der Waals force interactions. Before the carbon nanotube yarn 151 is embedded into the sealed container 110, the carbon nanotube yarn 151 is soaked in an ethanol solvent, and thermally treated by supplying a current thereto in vacuum. After the above processes, the carbon nanotube yarn 151 has improved electrical conducting and mechanical strength.

The cathode electrode 150 is electrically conducted with a cathode terminal 153, which runs from the inside to the outside of the sealed container 110 and is electrically connected with the power source. In one embodiment, as shown in the figure, the cathode 150 and the cathode terminal 153 are composed of a metal wire. The sealed container 110 includes a bottom wall (not labeled). The cathode electrode 150 extends through the bottom wall of the sealed container 110 and runs from inside to outside of the sealed container 110 via the cathode terminal 153.

The electrically conductive shielding enclosure 160 is a hollow member having a top wall 162 and a peripheral wall 161 extending from the top wall 162 along a direction away from the anode electrode 140. The shape of the cross-section of the enclosure 160 may be circular, ellipsoid, triangular, quadrangular, or polygonal. The peripheral wall 161 of the enclosure 160 surrounds the carbon nanotube yarn 151. The enclosure 160 further includes an opening 163 defined on the top wall 162. The opening 163 faces towards the carbon nanotube yarn 151. The peripheral wall 161 of the enclosure 160 is electrically connected to a connector 164, which runs from the inside to the outside of the sealed container 110 and is electrically connected to the power source.

The pixel tube 100 may further includes a getter 170 configured for absorbing residual gas inside the sealed container 110 and maintaining the vacuum in the inner space of the sealed container 110. More preferably, the getter 170 is arranged on an inner surface of the sealed container 110. The getter 170 may be an evaporable getter introduced using high frequency heating. The getter 170 also can be a non-evaporable getter.

The pixel tube 100 may further include an air vent 180. The air vent 180 can be connected with a gas removal system (not shown) such as, for example, a vacuum pump for creating a vacuum inside the sealed container 110. The pixel tube 100 is evacuated to obtain the vacuum by the gas removal system through the air vent 180, and is then sealed.

The pixel tube 100 may further include a dielectric member 190 arranged between the cathode electrode 150 and the peripheral wall 161 of the enclosure 160 for fixing the cathode electrode 150 therein The dielectric member 190 is contacting with the peripheral wall 161 of the enclosure 160.

In operation, voltages are separately supplied to the anode electrode 140, the cathode electrode 150, and the enclosure 160. An electric field is formed between the cathode 150 and the top wall 162 of the enclosure 160, electrons will be emanated from the carbon nanotube yarn 151. The electrons move through the opening 163 of the enclosure 160 and are transmitted through the anode electrode 140 by the high-voltage supplied to the anode electrode 140 to hit the phosphor layer 130 in a manner such that visible light is emitted. Part of the light is transmitted through the light permeable portion 120, part is reflected by the anode electrode 140 and transmitted out of the light permeable portion 120. Using the carbon nanotube yarn 151, enhances the luminance of the pixel tube 100 whilst using only a relatively low voltage. Since the cathode electrode 150 is arranged in the enclosure 160, the enclosure 160 can shield the high-voltage supplied to the anode electrode 140 to protect the carbon nanotube yarn 151. Thus, the carbon nanotube yarn 151 has a long life. Furthermore, the amount of the electrons emitted from the carbon nanotube yarn 151 can be adjusted by adjusting the voltage supplied to the enclosure 160 such that the luminance of the pixel tube 100 can be adjusted.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pixel tube for a field emission device, comprising:
a sealed container having a light permeable portion and a bottom;
a phosphor layer formed on the light permeable portion in the sealed container;
an anode electrode formed on the phosphor layer;
a cathode electrode arranged in the sealed container and facing the light permeable portion;
a carbon nanotube yarn attached to the cathode electrode and extending toward the light permeable portion for emitting electrons therefrom;
an electrically conductive shielding enclosure arranged in the sealed container, the enclosure including a top wall and a peripheral wall extending from an edge of the top wall, the peripheral wall surrounding the carbon nanotube yarn therein, the top wall defining an opening therein; and
a dielectric member filled between the cathode and the peripheral wall of the enclosure, the dielectric member contacting with the peripheral wall of the shielding enclosure, and wherein the cathode electrode extends through the dielectric member toward the anode electrode, and the dielectric member is located entirely in the enclosure;
wherein the peripheral wall of the enclosure is electrically connected to a connector running from an inside to an outside of the sealed container, and the shielding enclosure is fixed on the bottom of the sealed container via the connector.

2. The pixel tube for the field emission device as claimed in claim 1, wherein the cathode electrode is a metal wire and extends through a center line of the dielectric member.

3. A pixel tube for a field emission device, comprising:
a sealed container having a light permeable portion;
a phosphor layer formed on the light permeable portion in the sealed container;
an anode electrode formed on the phosphor layer;
a cathode electrode arranged in the sealed container and facing the light permeable portion;
a carbon nanotube yarn attached to the cathode electrode and extending toward the light permeable portion for emitting electrons therefrom; and an electrically conductive shielding enclosure arranged in the sealed container, the enclosure comprising a peripheral wall, a top wall, and a bottom part opposite to the top wall, the peripheral wall of the enclosure surrounding the carbon nanotube yarn therein and electrically connected to a connector running from an inside to an outside of the sealed container, the top wall defining an opening therein; and a dielectric member filled between the cathode and the peripheral wall of the enclosure, wherein the dielectric member is suspended in the enclosure between the top wall and the bottom part of the enclosure, and contacts only the cathode and the peripheral wall of the enclosure.

4. The pixel tube for the field emission device as claimed in claim 3, wherein the cathode electrode extends through the bottom wall of the sealed container and runs from inside to outside of the sealed container.

5. The pixel tube for the field emission device as claimed in claim 3, wherein a shape of the cross section of the sealed container is circular, ellipsoid, quadrangular, triangular, or polygonal.

6. The pixel tube for the field emission device as claimed in claim 3, wherein the sealed container is comprised of a non-metallic material.

7. The pixel tube for the field emission device as claimed in claim 6, wherein the sealed container is comprised of quartz or glass.

8. The pixel tube for the field emission device as claimed in claim 3, wherein the light permeable portion has a plane surface, a spherical surface, or an aspherical surface.

9. The pixel tube for the field emission device as claimed in claim 3, wherein a shape of the enclosure in cross-section is circular, ellipsoidal, triangular, quadrangular, or polygonal.

10. The pixel tube for the field emission device as claimed in claim 3, wherein the carbon nanotube yarn has a length in an approximate range from 0.1 millimeters to 10 millimeters.

11. The pixel tube for the field emission device as claimed in claim 3, wherein the carbon nanotube yarn has a diameter in an approximate range from 1 micrometer to 1 millimeter.

12. The pixel tube for the field emission device as claimed in claim 3, wherein the carbon nanotube yarn extends substantially perpendicular to the light permeable portion of the sealed container.

13. The pixel tube for the field emission device as claimed in claim 3, wherein the cathode electrode is a metal wire.

14. The pixel tube for the field emission device as claimed in claim 3, wherein the anode electrode is an aluminum film.

15. The pixel tube for the field emission device as claimed in claim 3, further comprising a getter arranged on an inner surface of the sealed container.

16. The pixel tube for the field emission device as claimed in claim 3, wherein the electrically conductive shielding enclosure has an open end facing away from the top wall thereof.

17. The pixel tube for the field emission device as claimed in claim 3, wherein the anode electrode comprises an anode terminal running from the inside to the outside of the sealed container.

18. The pixel tube for the field emission device as claimed in claim 3, wherein the enclosure is fixed on the sealed container via the connector.

* * * * *